United States Patent [19]

Gioutsos et al.

[11] Patent Number: 5,345,402

[45] Date of Patent: Sep. 6, 1994

[54] VEHICLE CRASH SIMULATOR SYSTEM FOR TESTING CRASH SENSORS

[75] Inventors: Tony Gioutsos, Brighton; Michael A. Piskie, Bloomfield Hills, both of Mich.

[73] Assignee: Automotive Systems Laboratory, Inc., Farmington Hills, Mich.

[21] Appl. No.: 71,785

[22] Filed: Jun. 4, 1993

Related U.S. Application Data

[63] Continuation-in-part of Ser. No. 841,381, Feb. 25, 1992, Pat. No. 5,251,161.

[51] Int. Cl.⁵ .................. G06G 7/48; B60Q 11/00; B60R 21/00
[52] U.S. Cl. .................. 364/578; 364/424.05; 307/10.1; 340/436; 340/438
[58] Field of Search .............. 364/578, 579, 551.01, 364/552, 424.05, 425, 426.01; 340/436, 438; 280/748; 307/10.1

[56] References Cited

U.S. PATENT DOCUMENTS

| | | | |
|---|---|---|---|
| 3,720,915 | 3/1973 | Hass | 340/438 X |
| 4,835,513 | 5/1989 | McCurdy et al. | 340/438 |
| 4,853,623 | 8/1989 | Sterler et al. | 324/158 R |
| 4,950,915 | 8/1990 | Spies et al. | 340/436 X |
| 4,990,884 | 2/1991 | McCurdy et al. | 340/438 |
| 5,164,901 | 11/1992 | Blackburn et al. | 364/424.05 |
| 5,182,459 | 1/1993 | Okano et al. | 307/10.1 |
| 5,185,701 | 2/1993 | Blackburn et al. | 364/425 |
| 5,187,465 | 2/1993 | Stonerook et al. | 340/438 |
| 5,229,943 | 7/1993 | Eigler et al. | 364/424.05 |

OTHER PUBLICATIONS

SAE Technical Paper Series, Pub. No. 920480, entitled "Automobile Crash Modeling and the Monte Carlo Method," by Michael A. Piskie and Tony Gioutsos.

*Primary Examiner*—Jack B. Harvey
*Assistant Examiner*—Eric W. Stamber
*Attorney, Agent, or Firm*—Lyman R. Lyon

[57] ABSTRACT

A system (10) for simulating vehicle crashes for testing or evaluating the reliability of a vehicle crash sensor (20) includes a model waveform generator (16) which utilizes a method of modeling an actual vehicle crash waveform to generate an infinite set of model crash waveforms, and subsequently inputs these sets of modeled crash waveforms into a thruster apparatus (12). The thruster apparatus (12) mechanically exerts a force onto the crash sensor (20) corresponding to each input model waveform. The crash sensor response is tracked and analyzed by a test analyzer (18). The model crash waveforms are generated by breaking down a predetermined crash waveform into a crash pulse (signal of interest) and multiplicative noise signal. The multiplicative noise signal is then statistically characterized as a function of time. Randomly variable waveforms from a white noise generator (128) are then modified with the statistical characterization and multiplied with the signal of interest to generate the infinite set of model crash waveforms.

4 Claims, 7 Drawing Sheets

VEHICLE CRASH SIMULATOR SYSTEM FOR TESTING CRASH SENSORS

The present invention is a continuation-in-part of Ser. No. 07/841,381, filed on Feb. 25, 1992 now U.S. Pat. No. 5,251,161.

BACKGROUND OF THE INVENTION

The present invention relates generally to vehicle crash discrimination systems, and more particularly to a system for simulating vehicle crashes for testing vehicle crash discrimination sensors to determine statistical reliability.

In the past, vehicle crash sensor modules have been tested for reliability by continually crashing vehicles under different crash conditions. Alternatively, a small finite set of crash waveforms were also generated for a particular vehicle model by actually crashing the vehicle under different crash conditions (i.e., vehicle speed, crash location, etc.). The finite sets of crash waveforms were generally used to represent all possible crash situations when testing and/or developing crash discrimination systems.

However, purposefully crashing vehicles to either test a crash sensor module, or to generate a finite set of crash waveforms is prohibitively expensive. Also, the small finite sets of crash waveforms do not provide a reliable or realistic representation of all crash scenarios which can occur in real world situations. Thus, crash discrimination systems calibrated, or tested, using these finite sets of crash waveforms are possibly unreliable over the entire range of possible crash scenarios. Simply increasing the number of vehicles actually crashed to increase the different crash scenarios under which a crash sensor module is tested, or to increase the finite sets of crash waveforms is not a realistic solution due to the expense of crashing vehicles. Further, each crash involving the same vehicle and crash scenario typically generates statistically variant crash waveforms.

SUMMARY OF THE INVENTION

It is therefore an object of the present invention to provide a vehicle crash simulator which provides economical and accurate testing of the performance of a crash discrimination sensor.

It is another object of the present invention to provide a vehicle crash simulator which utilizes a large number of vehicle crash waveforms having a correct statistical variation to reliably test the performance of a crash discrimination sensor in a variety of different crash scenarios.

It is another object of the present invention to provide a vehicle crash simulator which will permit a reliable statistical analysis of the overall performance of a crash discrimination sensor.

It is another object of the present invention to provide a vehicle crash simulator which utilizes a limitless set of vehicle crash waveforms statistically based on an actual crash waveform for testing the performance, or capability of a crash discrimination sensor.

In accordance with the present invention, a system for simulating vehicle crashes for testing a crash discrimination sensor comprises a means for generating a plurality of model crash waveforms which are statistically based on an actual crash waveform, and a means for physically applying the plurality of model crash waveforms to the vehicle crash sensor, wherein the sensor provides an output responsive to each applied model crash waveform. An analyzer means is provided for analyzing the sensor output relative to each respective one of the plurality of applied model crash waveforms, and to provide an output indicative of the operational reliability of the crash sensor. The means for generating a plurality of model crash waveforms comprises a means for separating a signal of interest from a predetermined crash data set, a means for generating a signal indicative of noise present in said predetermined crash data set based on said signal of interest, and a means for generating information characteristic of said noise signal. A randomly variable waveform generator provides a randomly variable waveform which is modified with the characteristic information by a modifying means. A means for combining the modified randomly variable waveform with the signal of interest generates each of the plurality of model crash waveforms.

In further accordance with the present invention, a system for evaluating a vehicle crash detection sensor performance comprises a model crash waveform generating means which includes a means for separating a signal of interest from a predetermined data set, a means for generating a signal indicative of noise present in the predetermined data set based on the signal of interest, a means for generating information characteristic of the noise signal, a means for generating a plurality of randomly variable waveforms, a means for modifying each of the plurality of randomly variable waveforms with the characteristic information, and a means for multiplying each of the modified randomly variable waveforms with the signal of interest to generate a plurality of model waveforms. A thruster means is responsive to the plurality of model waveforms for mechanically exerting on the crash detection sensor a force corresponding to each of the plurality of model waveforms, and a means for evaluating the crash detection sensor performance includes a means for determining an average crash detection sensor response to the plurality of model waveforms as exerted by the thruster means.

The present invention will be more fully understood upon reading the following detailed description of the preferred embodiment in conjunction with the accompanying drawings.

BRIEF DESCRIPTION OF THE DRAWINGS

FIGS. 9(a)-(d) are graphs illustrating various rough road data sets.

DETAILED DESCRIPTION OF THE PREFERRED EMBODIMENT OF THE INVENTION

Figure 1:
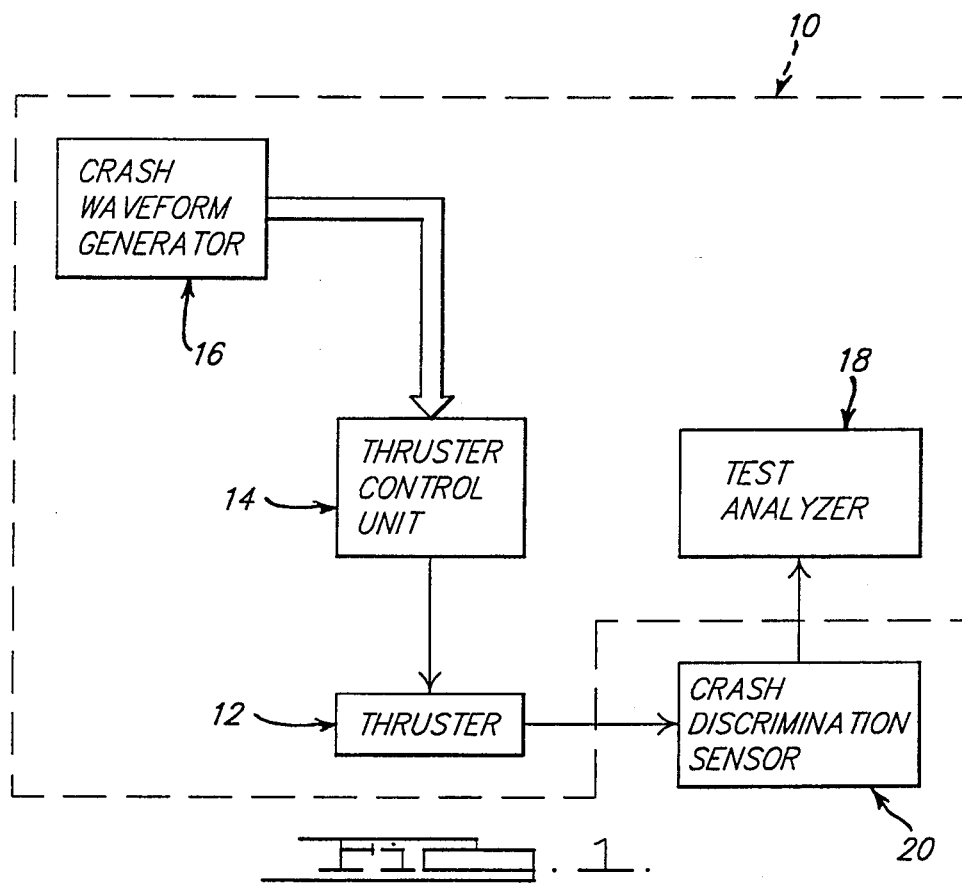
FIG. 1 is a block diagram of a vehicle crash simulator in accordance with the present invention.

Referring to FIG. 1, there is shown a block diagram of a vehicle crash simulator 10 in accordance with the present invention. The vehicle crash simulator 10 comprises a mechanical thruster apparatus 12, a thruster control unit 14, a crash waveform generator 16, and a test analyzer unit 18, such as implemented by a microprocessor or computer. The crash waveform generator 16 supplies a plurality of crash waveforms to the thruster control unit 14, which subsequently controls the operation of the thruster apparatus 12 so as to physically apply the respective waveforms to a crash discrimination sensor module 20 as a mechanically exerted force corresponding to the received model crash waveform.

The test analyzer unit 18 monitors the performance, or response, of the crash discrimination sensor module 20 relative to the plurality of applied crash waveforms. Test analyzer unit 18 tracks the overall performance of the crash discrimination sensor module to measure the sensor's statistical reliability. The crash waveform generator provides numerous sets of different types of crash waveform data sets having correct statistical variations from actual crash waveform data sets, as described in more detail hereinbelow. Thus, the sensor 20 can be tested by simulating thousands of vehicle crashes with the thruster apparatus 12 to provide a very accurate and statistically correct measurement of a crash discrimination sensor's reliability.

FIGS. 2-9 and the accompanying description hereinbelow, set forth the preferred method and circuit utilized by the crash waveform generator 16 to generate the model crash waveforms, or crash waveform data sets, having a correct statistical variance based on an actual crash waveform data set. Generally, a crash data set (a crash data set is the measured G values in time for a real crash) is assumed to have an underlying pulse shape. The pulse shape is usually assumed to be of haversine, half-sine or some other tapered rectangular shape. This assumption is fairly accurate when examining typical cash data sets. In fact, if the crash data is filtered down to a very small bandwidth (e.g. 10 Hz), the tapered rectangular pulse shape will often appear. In the crash data set, the crash pulse will typically be accompanied with "noise." Noise is simply that part of the crash data set that does not match the pulse shape (i.e. it does not contribute to the change in velocity).

Figure 2A:
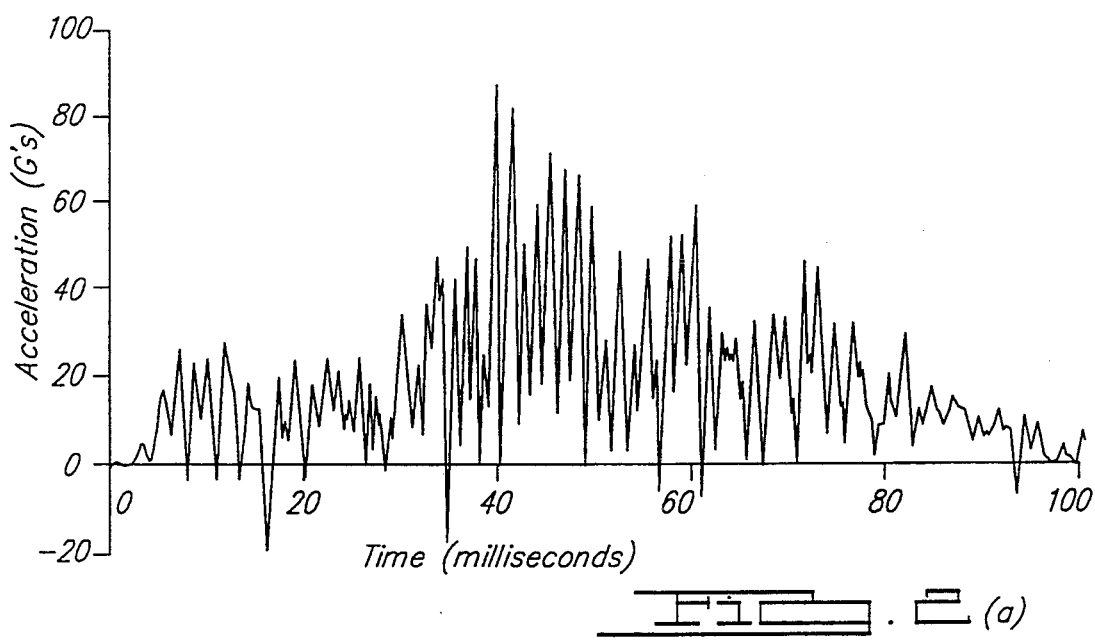
FIG. 2(a) is a graph illustrating an actual crash data set.
Figure 2:
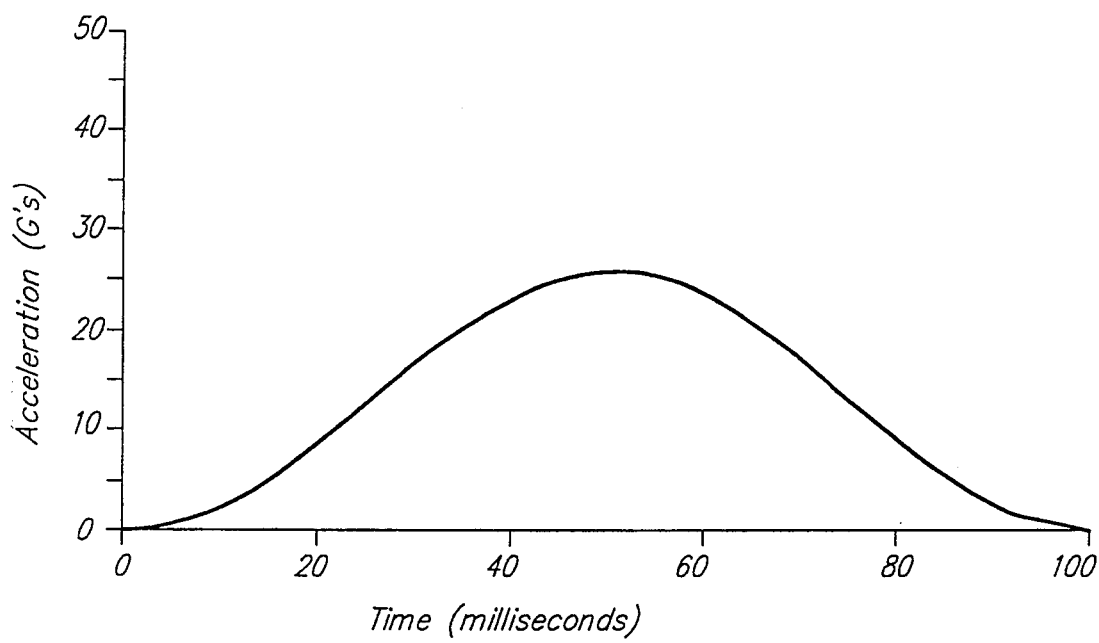
FIG. 2(b) is a graph illustrating a haversine crash pulse of FIG. 2(a)
FIG. 2(c) is a graph illustrating the noise content of FIG. 2(a)
Figure 2:
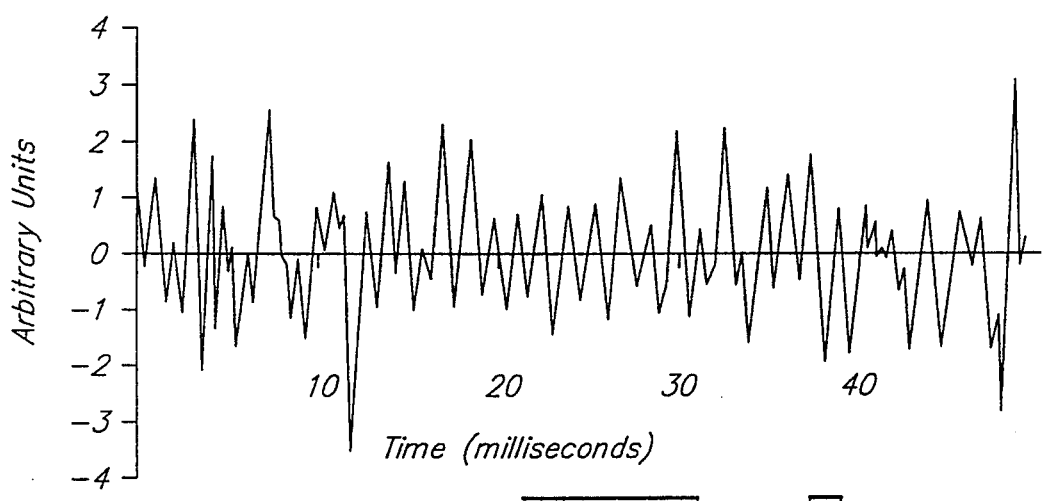

Referring to FIG. 2(a), there is shown a plot of an actual crash data set. FIG. 2(b) illustrates a hayersine pulse of appropriate length and amplitude to match the crash data set of FIG. 2(a). The haversine crash pulse is divided from the crash data set waveform to find the noise (shown in FIG. 2(c)) content. Noise corrupts the ability to detect the haversine pulse within the crash data set. In order to properly model a crash data set (waveform), the present invention models the noise element, and then adds the modeled noise element to a crash pulse.

In general, the output of a system containing a signal corrupted with noise can be written as:

$$C(t) = (1 + m(t)) \cdot h(t) + n(t) \quad (1)$$

where
- c(t) is the output at time t;
- m(t) is the multiplicative noise term at time t;
- h(t) is the signal of interest at time t; and
- n(t) is the additive noise term at time t.

It is noted that m(t) can be multiplied by a heuristically developed factor to provide damping at the beginning and end of the crash data set.

In accordance with the present invention, c(t) is simply the actual crash data G value at time t (i.e. the crash data set), and h(t) is the crash pulse (e.g. haversine) at time t. The noise factors provide the most difficulty in the modeling analysis. The noise factors are based on the vehicle structure (i.e. the transfer function of the vehicle), and the crash type (i.e. the input to the transfer function of the vehicle). Since both the transfer function of every vehicle (even for the same model, due to different metal forming, temperature, construction, etc.) and the crash type are variant, so are the noise factors.

However, an observation of the noise element shown in FIG. 2(c) indicates the variance of the noise increases with increasing G values of the haversine crash pulse. This implies the multiplicative noise term is significantly larger than the additive noise term. In other words, the additive noise term is relatively insignificant. This consideration simplifies the model equation to:

$$c(t) = (1 + m(t)) \cdot h(t) \quad (2)$$

where
- c(t) is the crash data set;
- m(t) is the multiplicative noise term with a given distribution; and
- h(t) is the crash pulse (e.g. haversine). Thus, from this equation the multiplicative noise term can be characterized by the following equation:

$$m(t) = \frac{c(t)}{h(t)} - 1 \quad (3)$$

where
- m(t) is the multiplicative noise term with a given distribution;
- c(t) is the crash data set; and
- h(t) is the crash pulse (e.g. haversine).

The multiplicative noise m(t) can further be statistically stated by the equation:

$$m(t) = b(t) \cdot \text{doft} + \text{mmoft} \quad (4)$$

where
- m(t) is the multiplicative noise term;
- b(t) is the normalized noise;
- doft is the constant variance of the multiplicative noise; and
- mmoft is the constant mean of the multiplicative noise. To provide an accurate statistical characterization of the multiplicative noise term, the equation (4) is modified to reflect the variance and mean factors as functions of time.

The statistical characterization of the multiplicative noise can then be expressed as:

$$m(t) = b(t) \cdot \text{doft}(t) + \text{mmoft}(t) \quad (5)$$

From equations (5) and (3), a crash data set c(t) can be expressed as follows:

$$c(t) = h(t) \cdot [b(t) \cdot \text{doft}(t) + 1 + \text{mmoft}(t)] \quad (6)$$

With a variable input signal generating source, such as a white noise generator, a filter designed to use equation (6) will generate an infinite set of correlated crash data. The infinite set of correlated crash data is then processed with the statistical multiplicative noise characteristics to generate an infinite number of simulated (model) crash data sets which exhibit statistical characteristics of an actual crash waveform.

Figure 3:
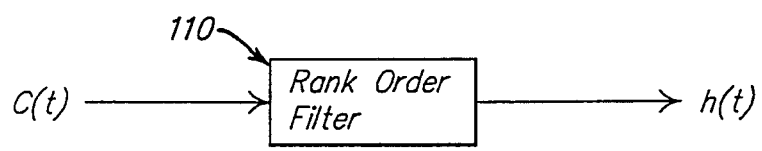
FIG. 3 is a block diagram for generating a signal of interest.
Figure 4:
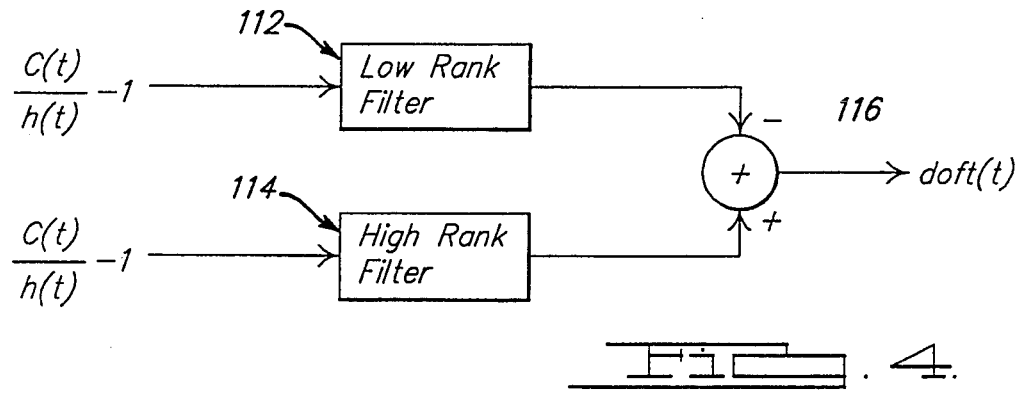
FIG. 4 is a block diagram for generating the variance function of the multiplicative noise.
Figure 5:
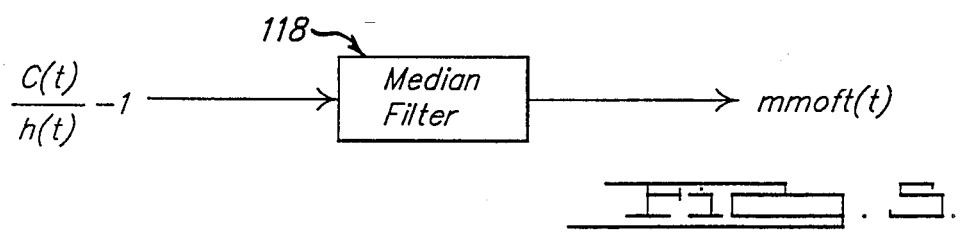
FIG. 5 is a block diagram for generating the mean function of the multiplicative noise.
Figure 6:
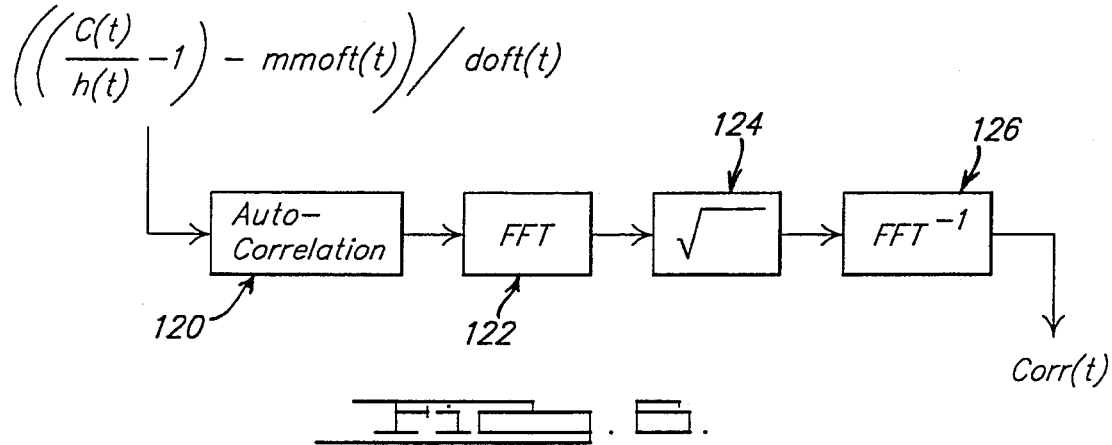
FIG. 6 is a block diagram for generating the correlative filter function.

Referring to FIGS. 3-7, there is shown a preferred embodiment for generating a plurality of crash waveforms modeled as described above. More particularly, FIG. 3 illustrates applying an actual crash data set to a rank order filter 110 (approximately median) to generate a haversine type crash pulse h(t). To generate the multiplicative noise term, the crash data set is divided by the crash pulse h(t), and the value "1" is subtracted from the result. The variance function doft(t) is generated by summing 116 the negative low rank filter 112 and the high rank filter 114 products of the multiplicative noise, as shown in FIG. 4. The mean function mmoft(t) is produced by median filtering 118 the multiplicative noise (FIG. 5). Referring to FIG. 6, the correlative filter function corr(t) is generated by creating the normalized noise input based on equation (6). The normalized noise is then processed by the following steps: autocorrelation 120, fast fourier transform 122, square root operation 124, and inverse fast fourier transform 126.

Figure 7:
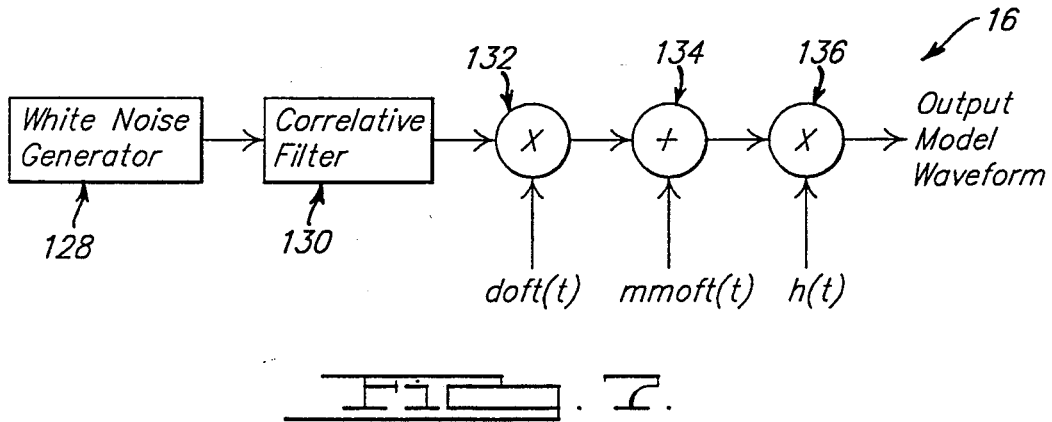
FIG. 7 is a block diagram for generating a model crash waveform.
Figure 5A:
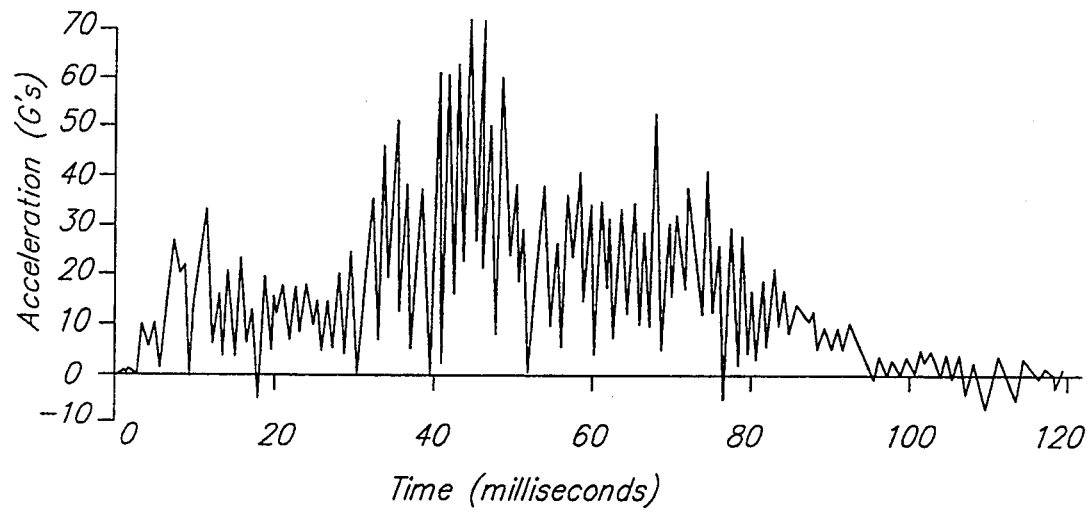
Figure 5B:
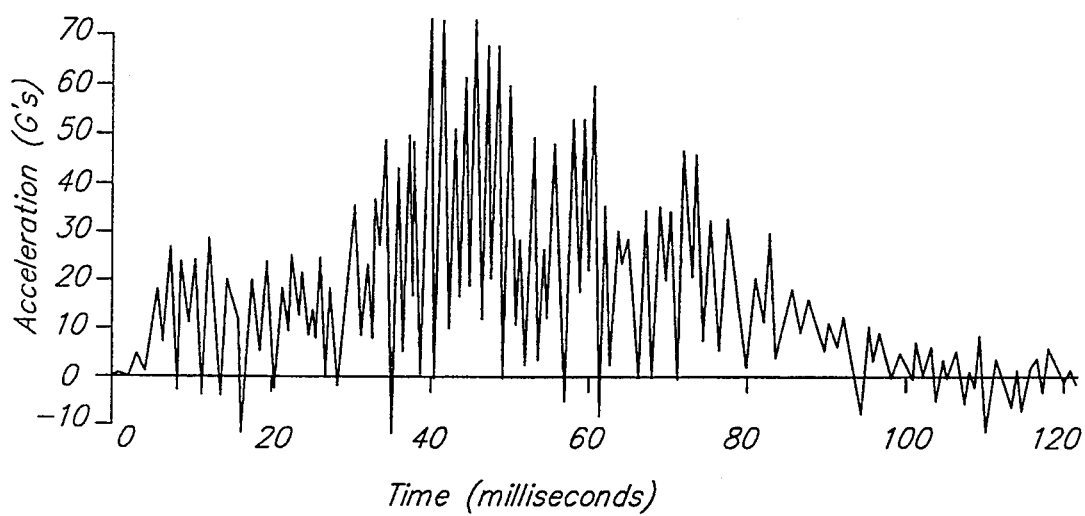
Figure 5C:
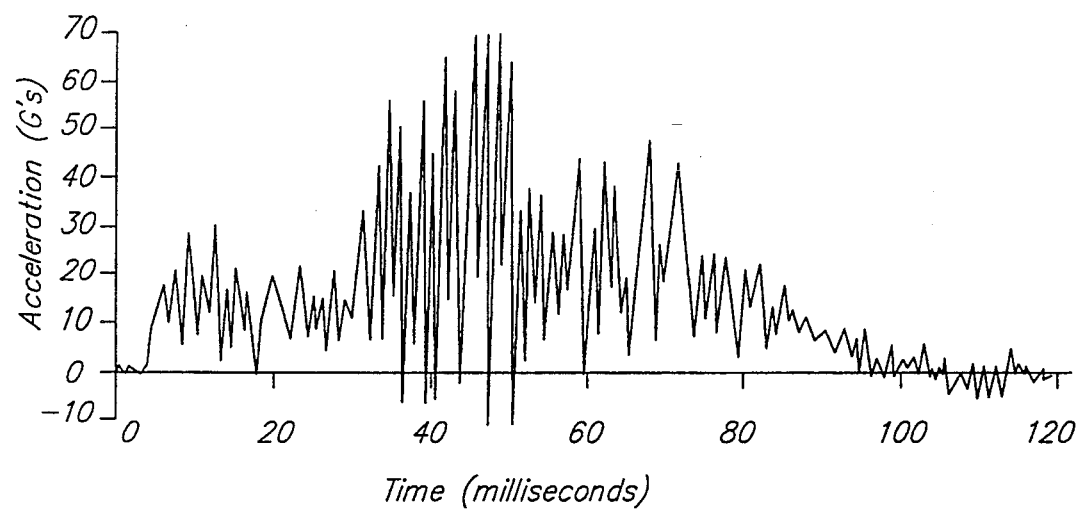
Figure 5D:
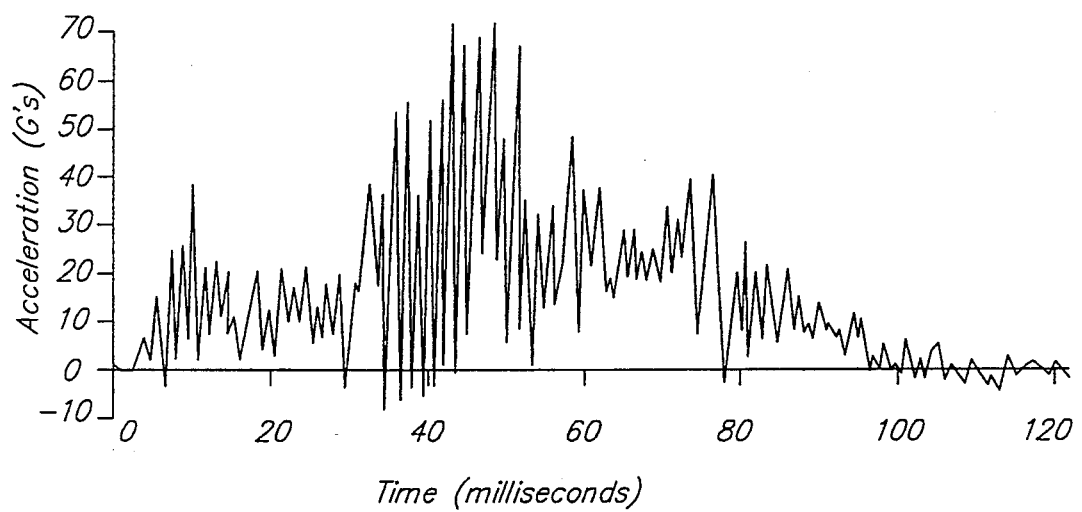
Figure 8A:
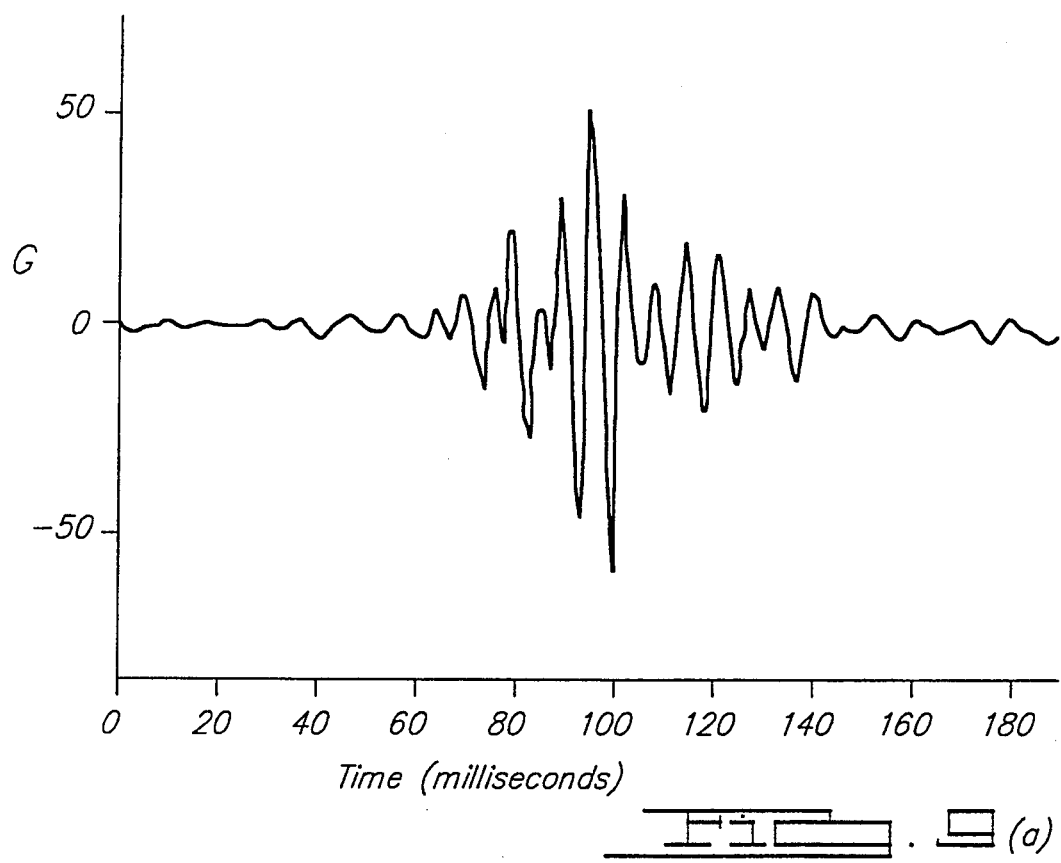
FIGS. 8(a)–(d) are graphs illustrating three model crash data sets generated by the crash simulator of FIG. 1 along with a plot of the original crash data set.
Figure 8B:
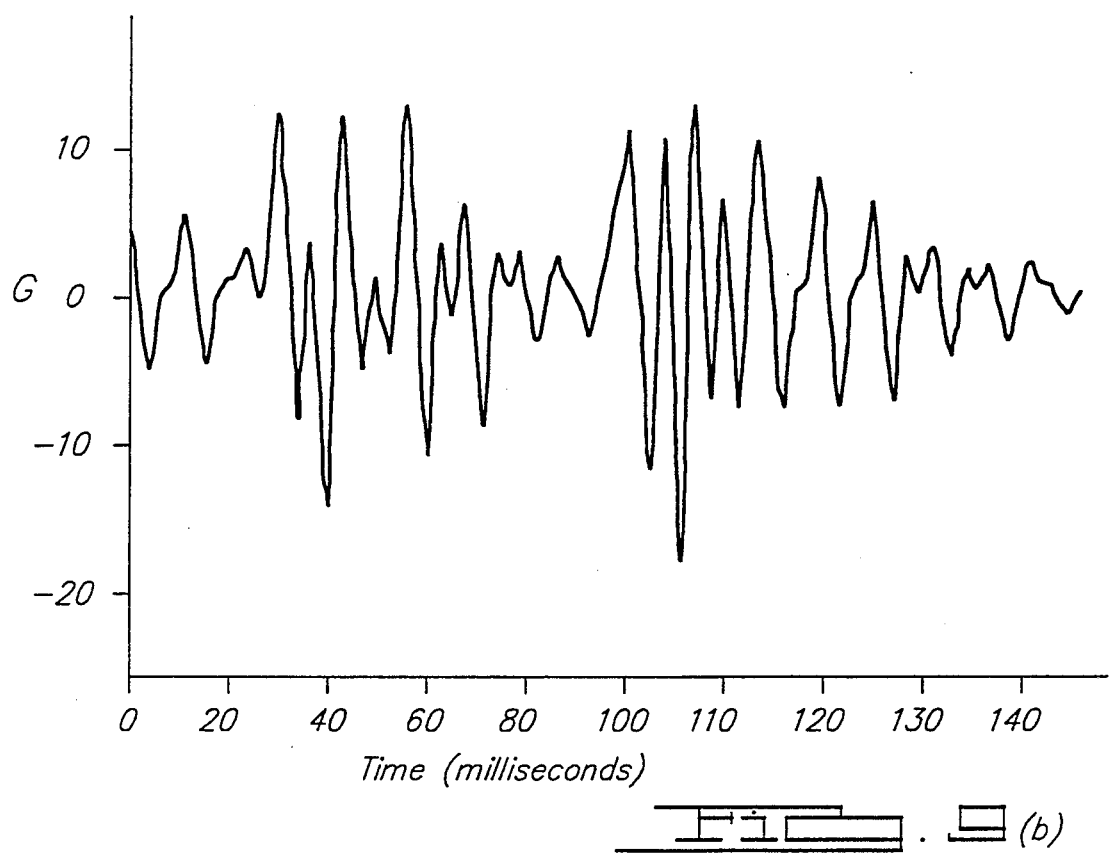
Figure 8C:
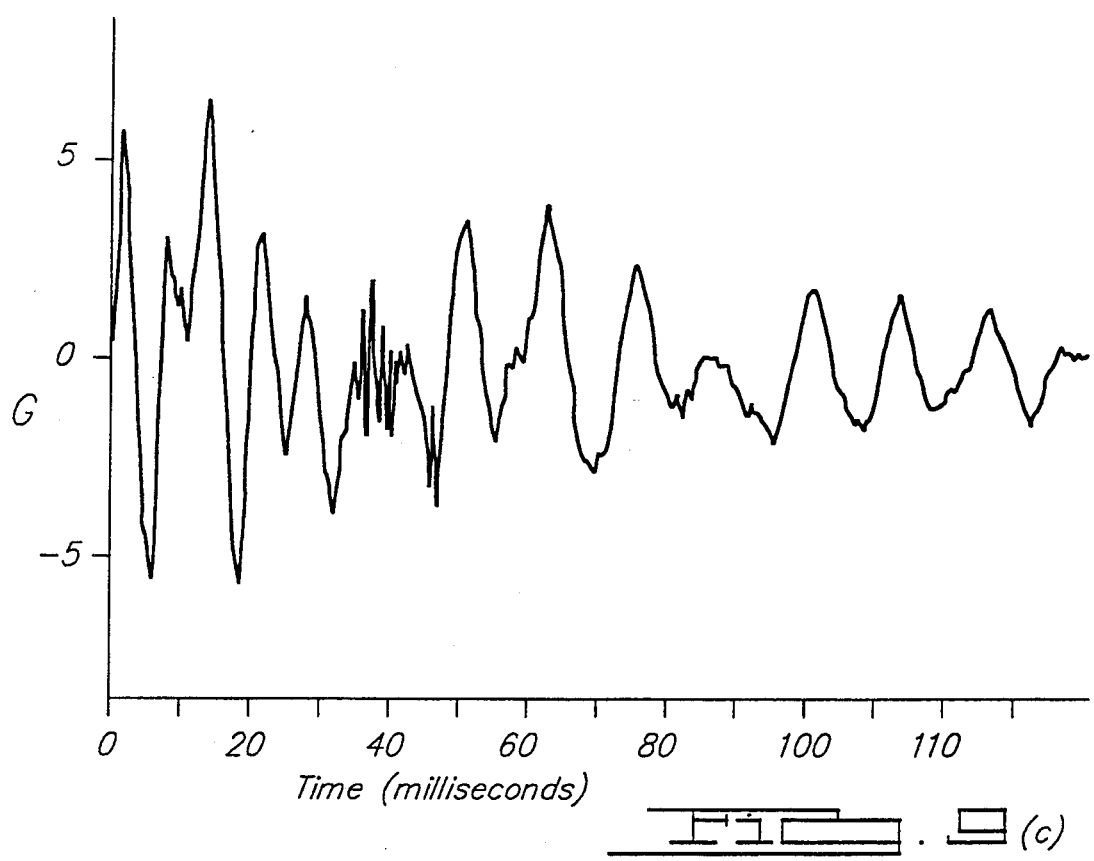
Figure 8D:
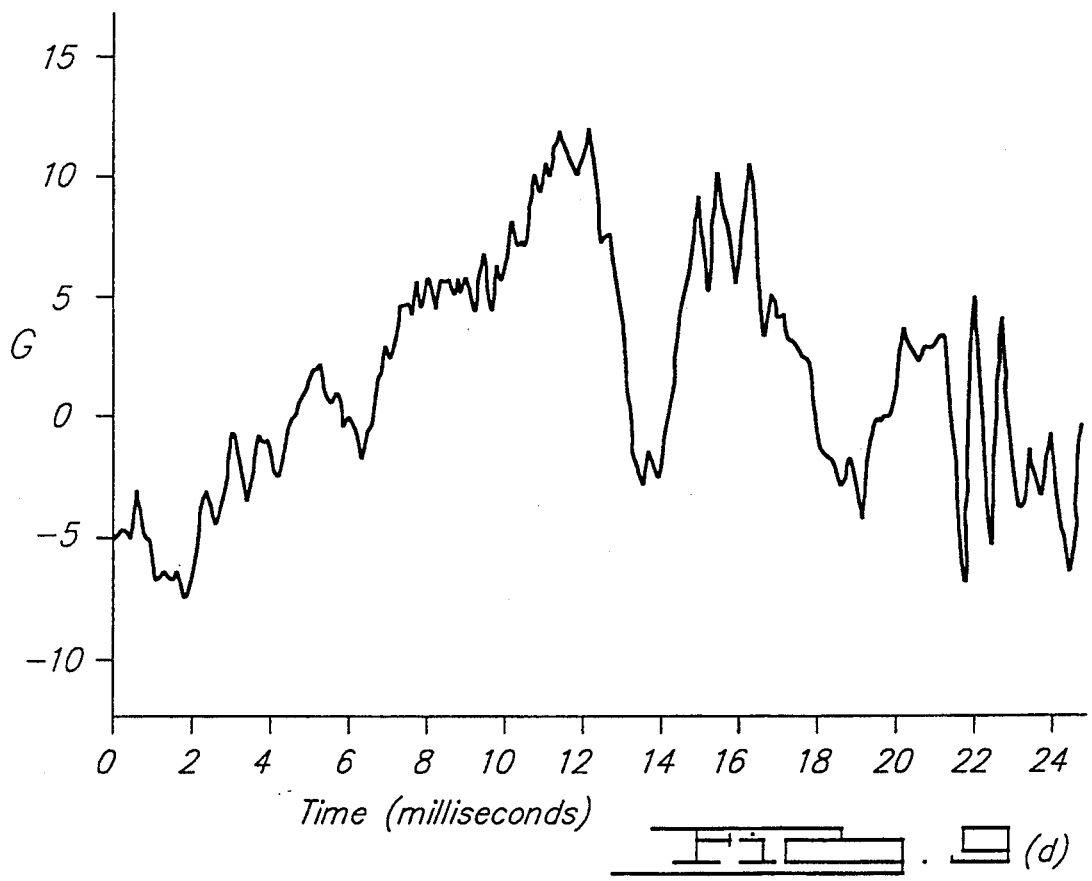

FIG. 7 shows the overall model crash waveform generator 16 utilizing the above described statistical crash waveform characteristics. The white noise generator 128 supplies a randomly variable input waveform to correlative filter 130. The variance function 132, mean function 134 and crash pulse 136 are applied to the correlated data set in accordance with equations (5) and (6) to generate an infinite set of crash waveforms exhibiting the identical statistical characteristics of an actual crash data set. Referring to FIGS. 8(a)-(d), FIGS. 8(a), (c) and (d) show the plots of three respectively modeled crash data sets along with the original crash data set illustrated in FIG. 8(b).

In further accordance with the present invention, a crash discrimination sensor can also be tested using simulated rough road conditions (e.g. vehicle driving over Belgian blocks, vehicle hitting a curb, etc.). Simulating rough road conditions entails the same techniques described hereinabove for simulating crash data sets. A known signal model can be chosen with noise included in the analysis. However, the signal model can be varied such as by varying the waveforms width, amplitude, and shape. The above described crash waveform model could also be varied this way.

FIGS. 9(a)-(d) present four different types of rough road scenarios. FIG. 9 (a) was produced by driving a vehicle over Belgian blocks. FIG. 9(b) was produced by panic stopping the vehicle over a bumpy road. FIG. 9(c) was produced by a vehicle hitting a curb. FIG. 9(d) presents rough road of a pulse type nature. Each one of these data sets can be modeled by a signal having added noise. However, accurate modeling of the signal can significantly reduce the noise element in these scenarios. For example, the rough road in FIG. 9(a) can be modeled as:

$$r(t) = a \cdot h(t) \cdot \sin(ft) \quad (7)$$

where
h(t) is a hayersine pulse length T;
a is the amplitude of the hayersine; and
f is frequency of the sine wave, which is about 10 times less than T.

Varying a, f, T and h(t) would produce millions of tests of Belgian block rough road data. Noise could be added to this model if desired (multiplicative and/or additive). FIG. 9(b) could be modeled as:

$$r(t) = a \cdot \sin(f_1 t) \cdot [\sin(f_2 t)] \quad (8)$$

where
a is the amplitude of the rough road;
$f_1$ is modulating sine wave frequency; and,
$f_2$ is frequency of carrier sine wave (about 10 times greater than $f_1$).

This model is similar to an Amplitude Modulated (AM) signal. One sine wave modulates another sine wave's amplitude. The parameters that can be varied to run countless simulations are: a, $f_1$ and $f_2$ as well as noise if desired. FIG. 9(c) could be modeled as:

$$r(t) = a \cdot e^{-bt} \cdot \sin(f_2 t) \quad (9)$$

where
a is peak amplitude;
b is decay factor of the exponential function; and
$f_2$ is frequency of the sine wave.

This again is the modulation of a sine wave, but with an exponential instead of another sine wave. Finally, FIG. 9(d) might be modeled as:

$$r(t) = a \cdot h(t) + n(t) \quad (10)$$

where
a is the amplitude;
h(t) is a hayersine pulse; and
n(t) is an additive noise term.
The parametric variables are: a, h(t) and n(t).

The above described method of crash waveform modeling can be utilized to form three different types of statistical models. The first type of model is referred to as the "same type" model. Specifically, a known crash waveform representative of certain type of vehicle crash (e.g. 30 m.p.h. into a brick wall, 30 m.p.h. into a 12" pole, etc.) is used to regenerate (simulate) an infinite number of the same type of crashes.

The second type of model is referred to as a "scaled version" model. In this model, the statistical parameters (i.e. mmoft, doft, h(t), etc.) from a known crash waveform are scaled to generate a scaled crash waveform. For example, a known 30 m.p.h. brick wall collision can be modeled to look like a 27 m.p.h. brick wall collision.

The third type of model is referred to as an "unknown type" model. In this model, the statistical parameters are all randomly varied to generate a set of random crash waveforms.

The present invention utilizes a statistical probability technique known as the Monte Carlo method to evaluate a crash detection system. As described above, the present invention provides the break down of an actual crash waveform into statistically non-variant pieces. Once the statistically non-variant pieces are known, an infinite number of crash waveforms can be generated simulating the same statistical characteristics of the actual crash waveform. The infinite number of waveforms can then be used in the Monte Carlo method to evaluate a crash detection system.

The Monte Carlo method is generally a statistical technique used for estimating solutions to problems which are too difficult to solve mathematically. The Monte Carlo method, as the name implies, originates from the casinos at Monte Carlo. The operators of the casinos wanted to know the probability (or chance) of winning (or losing) particular gambling events. One way to accomplish this is to derive the probability from known quantities. For example, the probability of rolling a seven using two dice is calculated by noting there are 36 possible combinations of the two dice, and only six of the combinations will be a seven. Therefore, the probability is 1/6th.

This approach is adequate for situations where the known quantities are relatively few in number. However, situations where the known quantities are large in number make mathematical calculations extremely difficult. On the other hand, the Monte Carlo method provides a technique which utilizes empirical observations to generate a sample average approach for determining the probability of an event occurring. For example, to determine the probability of winning at blackjack, a number of matches would be observed and the results would be recorded (i.e. x wins and y losses). The sample probability of winning would equal $x/(x+y)$. The sample probability converges to the true probability as the quantity $(x+y)$ approaches infinity (assuming some statistical properties like ergodicity). Thus, the Monte Carlo method entails the observation of many tests to determine the sample average probability. The larger the number of observations made, the more accurate the probability calculation will be.

In accordance with the present invention, the above described method and circuit for crash waveform modeling is advantageously used by the crash simulator 10 to evaluate the performance of crash detection systems, i.e., crash sensors, under the guidelines of the Monte Carlo technique of probability determination. A large numbers of crash waveforms can be generated to provide many test observations. For evaluating crash detection systems, the following basic situations provide the best criteria:

1) Do not Fire the vehicle safety device in a No-Fire situation.
2) Fire in a No-Fire situation.
3) Do not Fire in a Fire situation.
4) Fire in a Fire situation.

The 4)th situation can be modified to include the timing of the fire (too late or too early).

Using appropriate models, the parameters can be varied over their defined densities as many times as desired. For example, to calculate the probability of firing the vehicle safety device when the vehicle drives through Belgian blocks, the model parameters are simply varied. In this case it would be the amplitude, pulse shape, and sinusoidal frequency. The density of each parameter's variation must also be defined. For example, the amplitude could be varied from 3 G's to 7 G's independently and uniformly. The output is an accurate estimate of the crash detection systems probability of firing when the vehicle is traveling over Belgian blocks due to accurate modeling. It should be noted that the probability of inadvertent deployment or the probability of missing deployment (one or both) should never be zero for any reasonable modeling. The present invention can be utilized to test several different crash detection systems to find the crash detection system that produces the lowest values.

Another way of measuring performance could be to use a weighted scale. For instance, assume that the vehicle is more likely to be driven on a bumpy road than a highway (e.g. $4 \times 4$), then the crash detection system performance might be weighted in the bumpy road more than its highway rough road performance.

Finally, the performance of a crash detection system could be plotted after the appropriate weighting. The plot would be 3-Dimensional where the first axis is the probability of inadvertent deployment, the second axis is the probability of firing on time for a fire condition, and the third axis is the average time that the crash detection system fires before the required time. A good crash detection system will have low values for the first axis and high values for the other two axes.

With the present invention, a model can be developed for each potential rough road or crash scenario. Then a series of data sets can be run through a crash detection system of interest to help evaluate its effectiveness. It must also be noted that the rough road models and the crash models can be combined, concatenated, etc. in any fashion desired to produce even more potential measures of performance for a crash detection system.

It will be understood that the foregoing description of the preferred embodiment of the present invention is for illustrative purposes only, and that the various structural and operation features herein disclosed are susceptible to a number of modifications and changes none of which departs from the spirit and scope of the present invention as defined in the appended claims.

We claim:

1. A system for simulating vehicle crashes to test the reliability of a vehicle crash sensor comprising:
    means for generating a plurality of model crash waveforms by generating a plurality of statistical variations on an actual crash waveform;
    means for physically applying said plurality of model crash waveforms to said vehicle crash sensor, said sensor providing an output responsive to each applied model crash waveform; and
    means for analyzing said sensor output relative to each respective one of said plurality of applied model crash waveforms, said analyzing means providing an output indicative of the operational reliability of said crash sensor.

2. The system of claim 1 wherein said means for generating a plurality of model crash waveforms comprises:
    means for separating a signal of interest from a predetermined crash data set;
    means for generating a signal indicative of noise present in said predetermined crash data set based on said signal of interest;
    means for generating information characteristic of said noise signal;
    means for generating a randomly variable waveform;
    means for modifying said randomly variable waveform with said characteristic information; and
    means for combining said modified randomly variable waveform with said signal of interest to generate each of said plurality of model crash waveforms.

3. The system of claim 2 wherein said means for generating information characteristic of said noise signal comprises means for determining a mean and variance of said noise signal as a function of time.

4. A system for evaluating a vehicle crash detection sensor performance comprising:

model crash waveform generating means comprising:

means for separating a signal of interest from a predetermined data set;

means for generating a signal indicative of noise present in said predetermined data set based on said signal of interest;

means for generating information characteristic of said noise signal;

means for generating a plurality of randomly variable waveforms;

means for modifying each of said plurality of randomly variable waveforms with said characteristic information; and means for multiplying each of said modified randomly variable waveforms with said signal of interest to generate a plurality of model waveforms;

a thruster means responsive to said plurality of model waveforms for mechanically exerting on the crash detection sensor a force corresponding to each of said plurality of model waveforms; and means for evaluating said crash detection sensor performance including a means for determining an average crash detection sensor response to said plurality of model waveforms as exerted by said thruster means.

* * * * *